July 7, 1964    S. A. SCHERBATSKOY    3,140,395
DIRECTIONAL GAMMA-RAY DETECTOR
Filed May 11, 1961

INVENTOR.
Serge A. Scherbatskoy
BY
Ooms, McDougall and Hersh
Att'ys

United States Patent Office

3,140,395
Patented July 7, 1964

3,140,395
DIRECTIONAL GAMMA-RAY DETECTOR
Serge A. Scherbatskoy, 1220 E. 21st Place, Tulsa, Okla.
Filed May 11, 1961, Ser. No. 109,408
6 Claims. (Cl. 250—71.5)

This invention relates to gamma-ray detectors and is particularly concerned with detectors which are selectively responsive to radiation arriving from a particular direction. The invention also includes means by which gamma radiation within a predetermined energy range may be selectively detected on a directional basis. The present specification is a continuation-in-part of my co-pending application Serial No. 554,718, filed December 22, 1955, now U.S. Patent No. 2,984,745, issued May 16, 1961.

Figure 1:
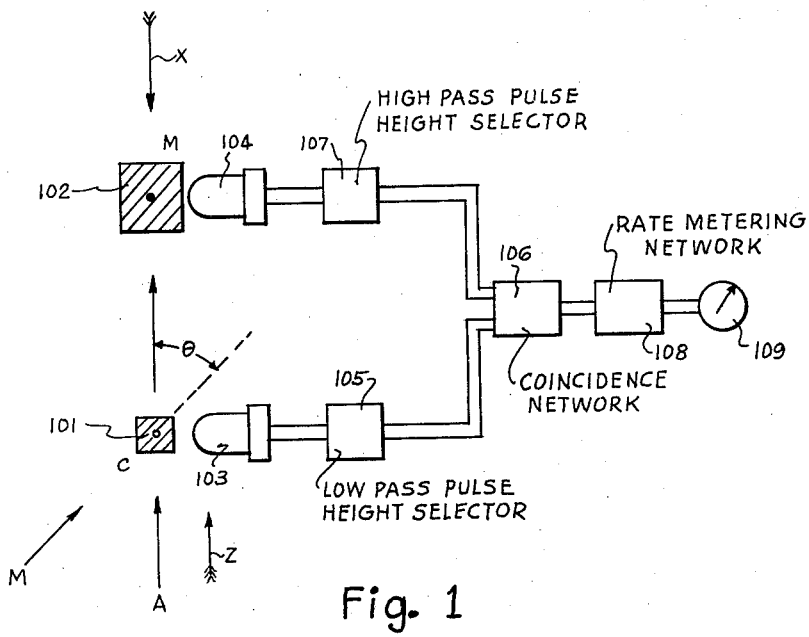
Figure 2:
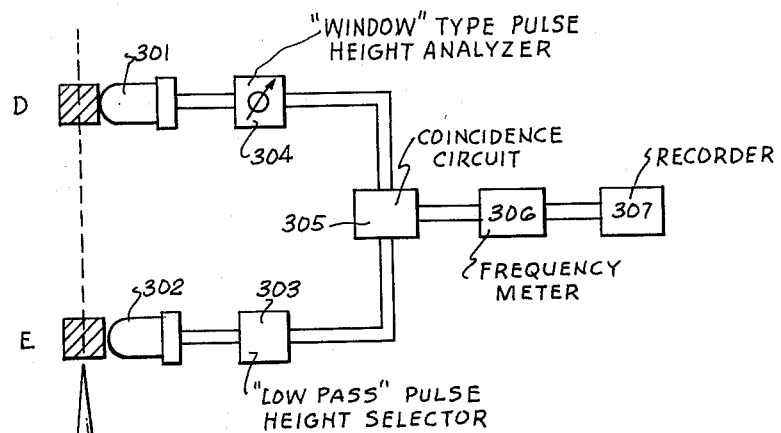

In the appended drawing, I have diagrammatically illustrated two embodiments of my invention; FIG. 1 illustrates a directional radiation detector embodying the basic principles of the invention, and FIG. 2 diagrammatically illustrates an alternative embodiment of the invention capable of more precise delineation with respect to both direction and energy level of detected rays.

Referring first to FIG. 1, I show therein an assembly comprising a scintillation phosphor 101 and a second scintillation phosphor 102. These two phosphors have respectively associated with them photomultipliers 103 and 104, which are adapted to develop electrical pulses corresponding to light flashes produced in the respective phosphors by gamma radiation interacting therewith, such pulses having magnitude proportional to the brightness of such flashes.

The line defined by the respective phosphors 101 and 102 is designated in FIG. 1 by the arrow A. Scintillation phosphor 101 is a relatively small radiation-sensitive element, while phosphor 102 is substantially larger or more dense than phosphor 101, or both.

The photomultiplier 103 has its output connected to a low-pass pulse-height selector 105, a device which is per se conventional and adapted to transmit only output impulses from photomultiplier 103 having magnitudes below a predetermined threshold value. The photomultiplier 104 has its output connected to a high-pass pulse-height selector 107, also per se a conventional device, which is characterized by transmitting only electrical impulses from photomultiplier 104 having magnitudes above a predetermined threshold value.

The outputs of pulse-height selectors 105 and 107 are fed to a coincidence network 106, which is in turn connected to a rate meter 108, the output of which is indicated on the meter 109.

When the apparatus of FIG. 1 is placed in a gamma-ray field, an incident photon arriving along the direction A–C may undergo Compton scattering in the phosphor 101, thus producing therein a flash of light. Because phosphor 101 is small in mass, no subsequent scattering of the photon will normally take place within that phosphor. The scattered photon will leave the phosphor 101 at an angle dependent on its original energy and the quantity of energy it has given up as the result of its interaction within the phosphor 101. If only a small amount of energy has been given up in phosphor 101, the direction of the scattered photon will be practically unchanged; i.e., it will leave the phosphor 101 along the general direction C–M and will hence enter the second phosphor 102.

Because phosphor 102 is large and massive compared to phosphor 101, it will normally absorb completely photons scattered by the phosphor 101.

When a gamma ray arrives along the direction A–C, and gives up only a small amount of its energy in the phosphor 101, it will proceed along a substantially unchanged direction and will enter phosphor 102, giving up the remainder of its energy thereto. This results in the production in the phosphor 101 of a relatively low-intensity flash and the production in the phosphor 102 of a substantially higher-intensity flash. These flashes produce electric pulses of corresponding intensity in the respective photomultipliers 103 and 104, both of which pass through the pulse-height selectors 105 and 107 and actuate the coincidence network 106. Since the two impulses reach the coincidence network 106 at substantially the same instant of time, they produce an output pulse from network 106 which is counted by the rate meter 108 and indicated on the meter 109.

The only gamma rays that will thus actuate the instrument of FIG. 1 are those arriving substantially along the direction A–C. A gamma ray arriving at phosphor 101 from some other direction, such as along the direction indicated by the arrow M, may undergo a scattering reaction in phosphor 101 which will result in a scattered ray along the direction C–M. Should this occur, however, the scattering angle $\theta$ will be relatively large, corresponding to substantial energy loss in the phosphor 101. This will result in an output pulse from photomultipler 103 of magnitude too great to be transmitted by the low-pass pulse-height selector 105. In most cases, moreover, the reduced-energy scattered ray, when it strikes and is absorbed by phosphor 102, will not produce an output pulse from photomultiplier 104 of sufficient intensity to be transmitted by the high-pass pulse-height selector 107.

From the foregoing it will be understood that the only photons having any significant probability of being detected and counted by the FIG. 1 apparatus will be those arriving at phosphor 101 along the direction A–C.

The apparatus of FIG. 1 is essentially unresponsive to rays arriving in the direction indicated by the arrow X—i.e., rays aligned along the direction A–C but directly opposite in sense.

Such rays, on striking the large, dense phosphor 102 will normally be completely absorbed therein and will not product any scattered ray which is intercepted by phosphor 101. Hence the coincidence of impulses necessary to produce an output from network 106 will not occur.

The width of the beam or cone of arriving gamma-ray photons that will be detected by the FIG. 1 apparatus may be controlled by suitable adjustment of the threshold of low-pass pulse-height selector 105; plainly, the higher the threshold of selector 105, the greater will be the acceptance angle of rays arriving generally along the line A–C that will be detected and counted by the FIG. 1 apparatus.

It is well known that the energy of a scattered photon $E_2$ is related to the energy of the incident photon $E_1$ and the scattering angle $\theta$ by the following equation:

$$E_2 = \frac{E_1}{1 + \frac{E_1}{mc^2}(1-\cos\theta)}$$

When the energies of rays are expressed in mev., $mc^2$ equals 0.5 mev.

The energy dissipated in a phosphor by a scattering interaction of course equals $E_1 - E_2$, and the greater the value of this dissipated energy, the greater the scattering angle $\theta$.

From the foregoing, it is clear that sharp directional resolution by the FIG. 1 detector calls for the lowest practicable threshold setting for the low-pass pulse-height selector 105. This threshold cannot be set too low, however, since thermal noise in the photomultiplier 103 does produce random output pulses of appreciable magnitude, and the threshold must be set at least somewhat above this thermal-pulse level. As a practical matter, it is usually desirable to set the threshold level of selector 105 so that it will pass impulses having a magnitude approximately twice as large as the thermal-noise pulses produced by the photomultiplier 103.

High-pass pulse-height selector 107 also plays an important part in the over-all operation of my invention, both with respect to spectral and directional selectivity.

Any ray scattered from phosphor 101 necessarily has at least slightly less energy than the incident ray, the difference being the energy lost in phosphor 101 and represented by the output pulse from photomultiplier 103. The threshold setting of high-pass selector 107 thus determines the lower energy limit of the gamma rays which my apparatus will detect. All rays of lower initial energy than the threshold setting of selector 107 will inherently be rejected, regardless of their direction.

The setting of high-pass selector 107 also has a bearing on the sharpness of my invention's directional response. Thus, for any given threshold setting of the low-pass selector 105, the effective acceptance angle of the instrument will be smaller, the higher the threshold setting of the high-pass selector 107. That this is true will be apparent to the skilled reader upon examination of the foregoing equation which relates the energies of the incident ray, the scattered ray, and the scattering angle. (It will be understood that I use the term "effective acceptance angle" to mean the angle by which an incident ray may deviate from the direction A—C (FIG. 1) and still be detected and counted by the apparatus of my invention.)

FIG. 2 illustrates a more refined form of the directional radiation detector of FIG. 1. In the FIG. 2 embodiment of the invention, two scintillation phosphors are used, respectively designated E and D. Phosphor E, which corresponds to phosphor 101 of the FIG. 1 embodiment, is a small radiation-sensitive element of such size as to afford a high probability that only a single gamma-ray scattering will occur within it. Phosphor D, which corresponds to phosphor 102 of FIG. 1, is massive relative to phosphor E, so as to afford a high probability that any gamma ray entering it will be wholly absorbed therewithin.

Associated with phosphor E is a photomultiplier 302, and associated with phosphor D is a photomultiplier 301. The output of photomultiplier 302 is fed to a low-pass pulse-height selector 303 which in turn feeds one of the inputs of a coincidence network 305. The output of photomultiplier 301 is connected to the input of a "window" type pulse-height analyzer 304, preferably of a type which can be arranged to "sweep" a substantial spectrum of pulse heights, transmitting at any given time only a narrow band of pulse heights.

The output of pulse-height analyzer 304 is connected to the other input of coincidence circuit 305. The output of coincidence circuit 305 feeds a rate meter (i.e., frequency meter) 306, the output of which is recorded by recorder 307.

Broadly speaking, the FIG. 2 detecting apparatus is responsive only to gamma rays arriving along the paths lying within a narrow cone having as its axis the direction line M which passes through phosphor E and thence through phosphor D. This cone, marked X on the drawing, represents the detection boundary defined by the effective acceptance angle of the apparatus.

In the FIG. 2 apparatus, as with that of FIG. 1, a low-pass selector 303 is preferably set so as to pass only pulses of magnitude slightly greater than the thermal pulses generated in photomultiplier 302, while pulse-height analyzer 304 is adjusted either to pass a single narrow band of large-magnitude pulses, representing high-energy rays, or is set to progressively "scan" in narrow increments a range of large-magnitude pulses. In the latter case, my instrument acts as a gamma-ray spectrometer with sharply defined directional properties. If the "window" of analyzer 304 is left fixed, my instrument acts as a radiation detector which selectively detects gamma rays which are sharply defined both as to direction and as to energy level.

As in the FIG. 1 apparatus, rays impinging on the phosphor E along directions lying outside the cone X are in general not detected by the instrument, the probability of such detection in a given case being very close to zero.

While I have in this specification described in considerable detail two illustrative embodiments of my invention, it is to be understood that this description has been merely illustrative. The scope of my invention is to be determined primarily by reference to the appended claims.

I claim:

1. Directional, spectrally selective gamma-ray detecting apparatus comprising first and second radiation detectors of the scintillation type spaced apart from one another, the line joining their centers defining an axis, said detectors being of the type which develop an electric pulse in response to a detected ray, the magnitude of such pulse being proportional to the energy dissipated in said detector by said ray, a low-pass pulse-height selector means connected to said first radiation detector and fed by electric pulses therefrom, said low-pass selector having a threshold level representing a predetermined energy level much less than that of the rays to be detected, second pulse-height selector means connected to said second detector and fed by electric pulses therefrom, said second selector means being operative to transmit only pulses representing energy levels greatly exceeding the threshold level of said low-pass selector, coincidence-sensitive means fed by both of said pulse-height selectors operative to provide an output signal only when output pulses from both of said selector means occur in substantial time coincidence, and means for measuring the repetition rate of output signals derived from said coincidence-sensitive means.

2. A spectrally selective, directional radiation-detecting device comprising first and second radiation detectors of the scintillation type spaced apart from one another along a line defining a reference direction, each of said detectors comprising a sensitive element adapted to emit light flashes responsive to interaction therewith of gamma rays impinging thereon, the mass of said element in said first detector being chosen to provide a high probability of a single interaction therein by an impinging ray, accompanied by emission therefrom of a scattered ray, and the mass of said element in said second detector being chosen to provide a high probability of total absorption therein of impinging gamma rays, said detectors being of the type operative to produce electric pulses having magnitudes representing the energy quanta dissipated therein by rays interacting therewith, a low-pass discriminating network connected to the output of said first detector and fed by electric pulses therefrom, a second pulse-height discriminating network connected to the output of said second detector and operative to pass only impulses representing energy quanta greatly exceeding the energy quanta represented by the electric pulses transmitted by said low-pass network, a coincidence network connected to the outputs of said respective discriminating networks, and indicator means connected to the output of said coincidence network.

3. A spectrally selective, directional radiation-detecting device comprising first and second radiation detectors spaced apart from one another, the line between them defining a reference direction, each of said detectors being provided with scintillating elements adapted to produce light flashes responsively to interactions of gamma rays therewith, each of said detectors having also photosensitive means arranged for cooperation with said scintillating elements operative to produce electric pulses having magnitudes proportional to the intensities of said light flashes, a low-pass pulse-height selector network fed by electric pulses from said first detector, said low-pass network being operative to pass only electric pulses representing light flashes of relatively low intensity, a second pulse-height selector network fed by electric pulses from said second detector, said second selector network being operative to transmit only electric pulses representing light flashes of relatively much greater intensity, a coincidence network connected to the outputs of both of said pulse-height selector means, and indicator means connected to the output of said coincidence network.

4. The apparatus defined in claim 3 wherein the mass of the scintillating element associated with said second detector substantially exceeds the mass of the scintillating element associated with said first detector.

5. The apparatus defined in claim 3 wherein said second pulse-height selector means is of the high-pass type adapted to transmit all impulses of magnitudes exceeding a predetermined threshold level.

6. The apparatus of claim 3 wherein said second pulse-height selector means is of the band-pass type adapted to transmit only pulses of magnitudes lying between predetermined lower and upper threshold levels.

References Cited in the file of this patent

UNITED STATES PATENTS 2,636,993    Jakobson _____ Apr. 28, 1953

OTHER REFERENCES

Measurement of Gamma-Ray Energies With Two Crystals in Coincidence, by Hofstadter et al., from the Physical Review, vol. 78, April–June 1950, pp. 619, 620.

Two-Crystal Gamma-Ray Scintillation Spectrometer, by R. E. Connally, from the Review of Scientific Instruments, June 1953, pp. 458, 459.